United States Patent [19]

Sullivan et al.

[11] 4,445,400
[45] May 1, 1984

[54] DIFFERENTIAL SPEED LIMITING DEVICE

[75] Inventors: William C. Sullivan, Newark, Ohio; Spencer M. Nimberger, Houston, Tex.

[73] Assignee: Rockwell International Corporation, Pittsburgh, Pa.

[21] Appl. No.: 306,052

[22] Filed: Sep. 28, 1981

[51] Int. Cl.³ .............................................. F16H 1/44
[52] U.S. Cl. ..................... 74/711; 14/710.5; 192/52; 192/70.21; 192/85 AA
[58] Field of Search .................. 74/710.5, 711; 192/52, 192/70.21, 85 AA, 103 R; 417/474

[56] References Cited

U.S. PATENT DOCUMENTS

| | | | |
|---|---|---|---|
| 3,015,970 | 1/1962 | Mueller | 74/711 |
| 3,230,795 | 1/1966 | Mueller | 74/711 |
| 4,012,968 | 3/1977 | Kelbel | 74/711 |
| 4,025,241 | 5/1977 | Clemens | 417/474 |
| 4,041,804 | 8/1977 | Clark | 74/711 |

Primary Examiner—Allan D. Herrmann
Assistant Examiner—Joseph M. Rolnicki

[57] ABSTRACT

A differential speed limiting device is for limiting the relative rotational speed between a first member and a second member of a differential which are capable of independent rotation about a common axis of rotation. A plurality of friction discs are alternatively secured to the first and second members and capable of being axially compressed to generate frictional contact therebetween tending to reduce the relative rotation between the first and second members. A peristaltic pump is mounted relative to the members so that relative rotation therebetween produces a peristaltic pumping of fluid which can be applied to the input side of a force multiplier to cause an output side of the force multiplier to operate an annular bellows to produce the axial movement required to compress the plurality of friction discs.

22 Claims, 8 Drawing Figures

DIFFERENTIAL SPEED LIMITING DEVICE

BACKGROUND OF THE INVENTION

1. Field of the Invention

This invention relates to a differential speed limiting device and, more specifically, to such a device which is totally self-contained and capable of generating sufficient force to a plurality of braking discs tending to limit the relative rotational speed between a pair of independently mounted rotating members.

2. Description of the Prior Art

Differentials for automotive vehicles have been employed in the art for many years to permit the movement of the driven wheels at different speeds when the vehicle is traveling on a curve. Similarly, differentials have been utilized in tandem axle configurations for allowing each of the pair of axles to be operated at different speeds according to the road or operating condition.

While the differentiation provided is generally desirable for tire wear and safe vehicle operation, there are occasions when it is preferable to prevent the differential action when one of the wheels or axles have lost traction on ice, mud, gravel or the like. In such a condition, the power is simply provided to the slipping wheel or axle which is incapable of providing sufficient traction for the movement of the vehicle.

Although there have been heretofore provided a number of devices for "locking out" such differentials, these devices have often required operator action, have been incapable of providing sufficient torque to properly limit the relative rotation, or have been relatively complicated and expensive to maintain.

SUMMARY OF THE INVENTION

It is, therefore, an object of this invention to provide a differential speed limiting device which is capable of limiting relative rotational speed between a first member and a second member without any outside action required by the vehicle operator.

It is another object of the invention to provide such a differential speed limiting device which is relatively maintenance free and intended to operate the life of the vehicle.

These and other objects of the invention are found in a preferred embodiment thereof in the form of a differential speed limiting device for limiting the relative rotational speed between a first member and a second member capable of independent rotation about a common axis of rotation. First and second friction disc means are respectively mounted for rotation with the first and second members and capable of being compressed axially to generate frictional contact therebetween tending to reduce the relative rotation between the first and second members. An annular housing is mounted for rotation with the first member and has an annular bellows mounted thereon having an extended end aligned with the first and second friction disc means. The extended end is capable of axial movement toward and away from the first and second friction disc means when a primary pressure of fluid within the bellows means is respectively increased and decreased. The housing includes therein a force multiplier which has an input end capable of having an intermediate pressure of the fluid acting thereon and an output end which produces the primary pressure of the fluid within the bellows means. The primary pressure is directly proportioned to and larger than the intermediate pressure. The housing has a pump portion which has an interior cylindrical surface located therein. A length of collapsable tubing means has a first end and a second end and is formed into a single loop about the interior cylindrical surface with the loop lying in a plane which is normal to the common axis. Planetary roller means are mounted in the plane for rotation with the second member and in frictional surface contact with the tubing means. The roller means is of such radial dimensions as to compress the tubing means against the interior cylindrical surface in a region of contact. A reservoir for the fluid is located in the housing. There is a first passage means for the fluid between the reservoir and the first end of the tubing means and a second passage means for fluid between the second end of the tubing means and the input end of the force multiplier. The second member is capable of rotating in a first direction relative to the first member to cause the roller means to circumferentially travel along the tubing means from the first end to the second end to produce peristaltic pumping of the fluid from the reservoir through the first passage means, the tubing means and the second passage means to the input end of the force multiplier to produce the intermediate pressure of the fluid therein. There is also means for discharging the fluid from the input end of the force multiplier to the reservoir to reduce the intermediate pressure of the fluid at the input end of the force multiplier when there is no rotation of the second member relative to the first member.

DESCRIPTION OF THE PREFERRED EMBODIMENTS

Figure 1:
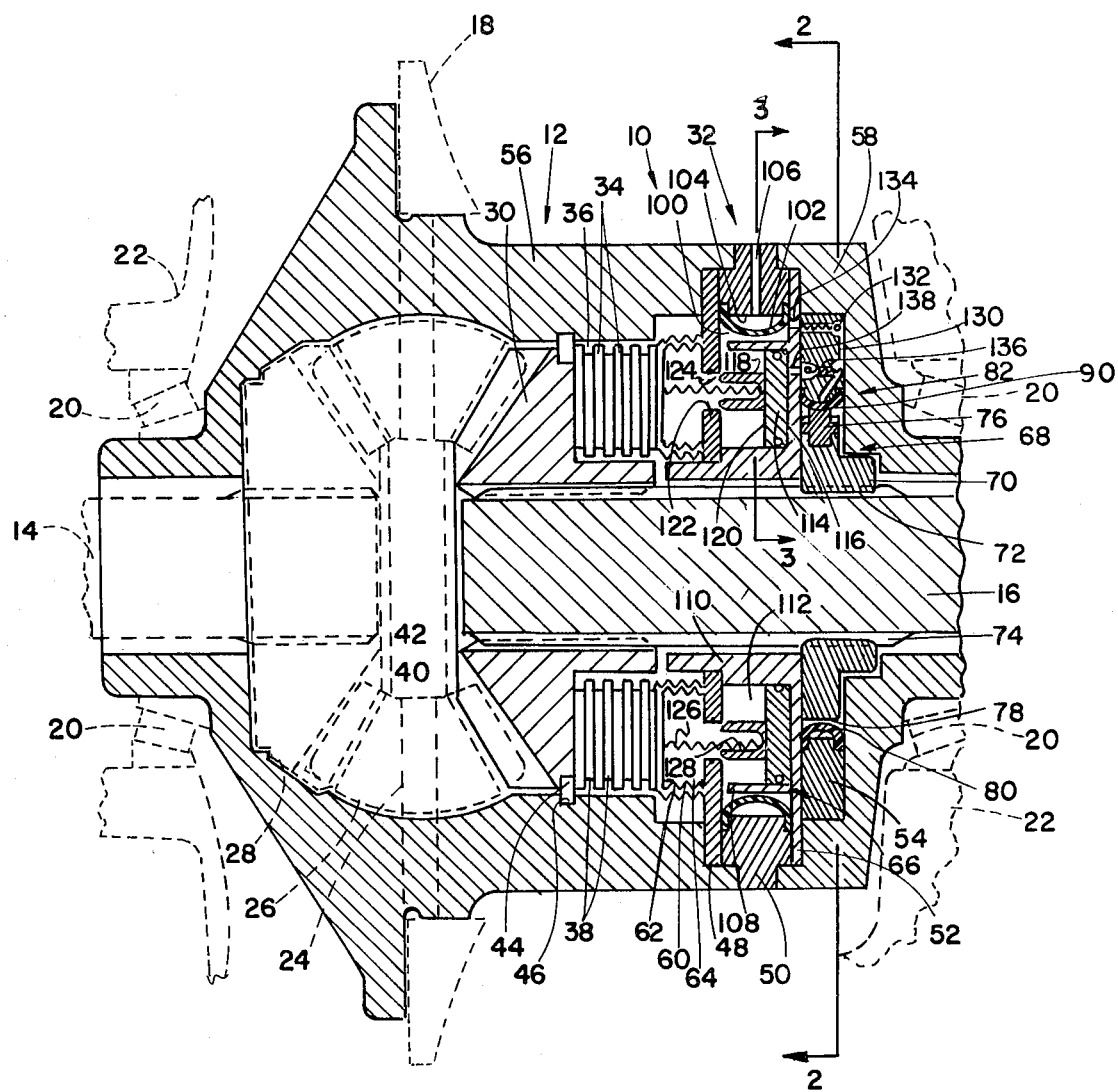
FIG. 1 is a sectional, elevational view of a differential assembly including the preferred embodiment of the invention.

As seen in FIG. 1, a preferred differential speed limiting device 10 is installed in a differential casing 12 of a typical differential of the type which drives a pair of axle shafts 14 and 16. An input shaft and pinion (not show) drive a ring gear 18 which is rigidly secured to the differential casing 12 to cause it to rotate at bearings 20 within the differential housing 22. A cross spider 24 is supported by the differential casing 12 and includes differential pinions 26 thereon which are in engagement with and which produce rotation of differential side gear 28 and 30 which are respectively secured to the shafts 14 and 16. Specifically, each side gear 28, 30 includes a splined opening therein which is mounted on a splined end of the axle shaft.

If the vehicle were to be driven in a straight line and operating under ideal conditions, there would be no difference in the rotational speed of the two shafts 14, 16 and the differential casing 12 would rotate at the same speed as the side gears 28 and 30. However, if there is a loss of traction to one of the wheels associated with one of the axle shafts, differentiation would occur so that a relative rotational speed would exist between the differential casing 12 and the side gear 30. To limit the relative rotational speed between these two members, a preferred embodiment of the invention is provided in the form of the differential speed limiting device 10. The differential speed limiting device 10 is basically mounted within the differential casing 12 at a location therein which has heretofore been utilized for providing different prior art means for preventing the relative rotation which can be produced by the differential. A number of these prior art devices utilize either a hydraulic or mechanical means for limiting the relative rotational speed but often include sensing means located elsewhere or require specific vehicle operator action to prevent relative rotation when it is not desired. However, the differential speed limiting device 10 of the present invention is self-contained and includes means for automatically limiting the relative rotational speed without any action being required by the vehicle operator or any outside means being utilized to sense the relative rotational speed. The preferred embodiment will be seen to be operable in either direction but only after a minimum relative rotational speed is experienced.

Figure 2:
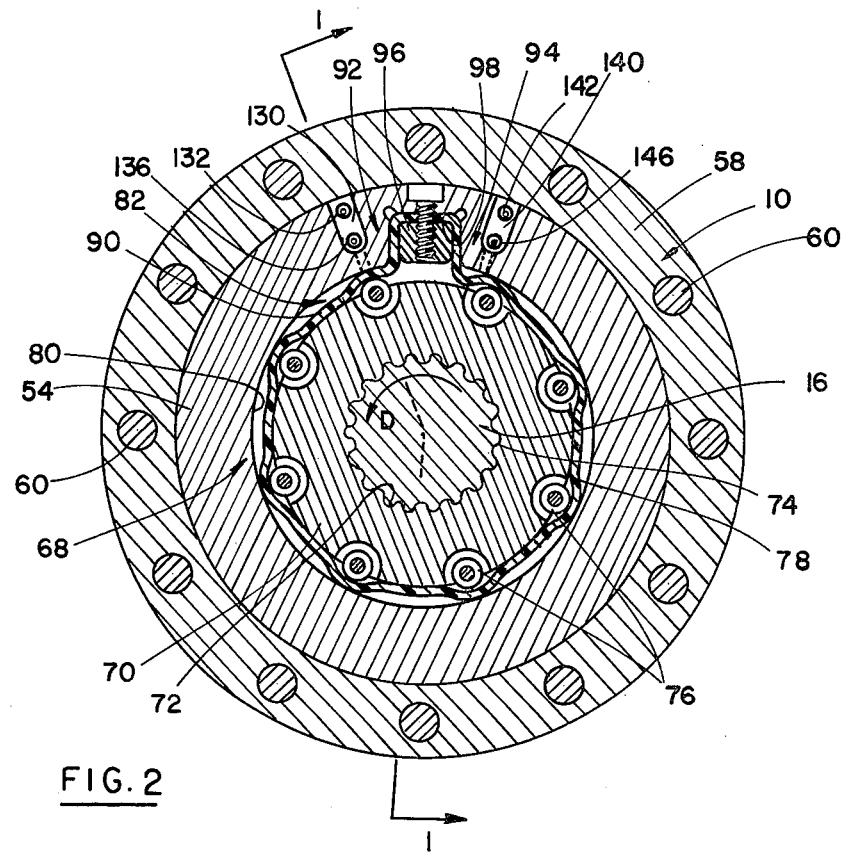
FIG. 2 is a view of the embodiment shown in FIG. 1 as seen along line 2—2.
Figure 3:
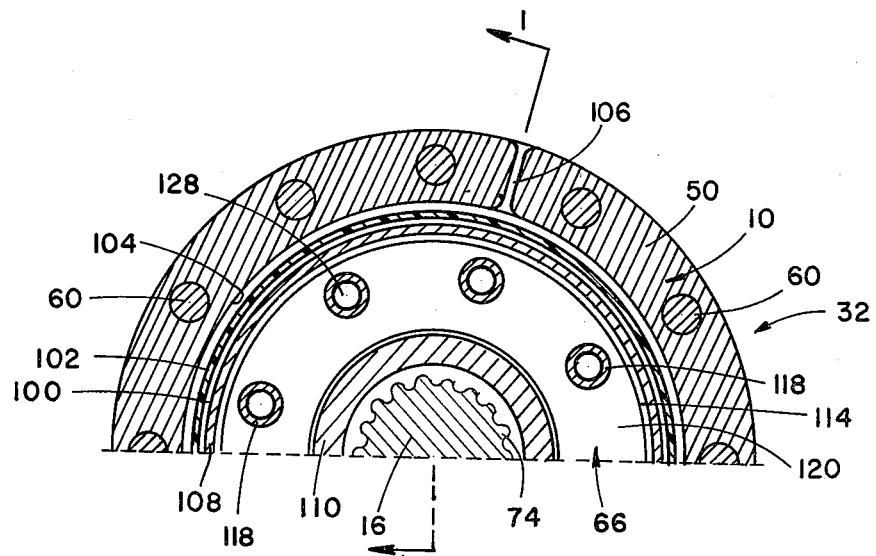
FIG. 3 is a view of the embodiment shown in FIG. 1 as seen along line 3—3.

As seen in FIGS. 1, 2 and 3, the preferred differential speed limiting device 10 primarily includes friction disc means associated with the differential casing 12 and the side gear 30 and an annular housing 32 which supports and includes the means for operating the friction disc means. A plurality of friction discs 34 are joined at their outer extremities to axially extending splines 36 within the interior of the differential casing 12 to insure their rotation therewith. A second plurality of friction discs 38 are joined at their interior extremities to axially extending splines 40 on a tubular extension 42 of the side gear 30. A backing ring 44 is installed within an interior circumferential groove 46 within the interior of the differential casing 12 between the side gear 30 and the friction discs 34, 38. Basically, the ring 44 prevents undesired axial movement of the side gear 30 and insures that the friction discs 34, 38 when moved axially toward the side gear 30 will instead act on the backing ring 44 to prevent the undesired application of force to the side gear 30 which would be detrimental to differential operation. Accordingly, the friction discs 34 and 38 will be relatively rotated according to the relative rotation of the differential casing 12 and the side gear 30 until some outside force is applied to axially compress the friction discs to create frictional contact therebetween tending to reduce the relative rotation between the differential casing 12 and the side gear 30.

To produce the desired compressive force on the friction discs 34 and 38, the annular housing 32 includes a means for generating fluid pressure through a peristaltic pumping of the fluid during relative rotation of the differential casing 12 and the side gear 30, multiplying the force of the pressure created by the pumping and applying a resulting force for the compression of the friction discs in a manner which will be described in detail hereinbelow. Structurally, the housing 32 includes an end plate 48, a support ring 50, an interior wall 52 having a L-shaped cross section and an annular wall 54. The housing 32 is rigidly secured to the differential casing 12 between a base portion 56 and an end portion 58 thereof. Specifically, a plurality of bolts 60 (not shown in FIG. 1) extend through the end portion 58 to join it to the base portion 56 with the end plate 48, the support ring 50 and the interior wall 52 secured therebetween. The annular wall 54 is sealingly captured between the interior wall 52 and an interior surface of the end portion 58 of the differential casing 12.

An annular bellows means 60 is sealingly secured to the end plate 48 in alignment with the friction discs 34 and 38 and includes an extended end 62 which is capable of axial movement toward and away from the friction discs 34, 38 when a fixed quantity of operating fluid entrapped within an interior 64 of the bellows means 60 is respectively increased and decreased in pressure. To create sufficient pressure within the interior 64 of the bellows means 60, the housing 32 includes a peristaltic pumping configuration for the generation of an intermediate pressure and a reservoir for maintaining a sufficient quantity of hydraulic oil to serve as the operating fluid for the differential speed limiting device. The intermediate pressure created by the pumping is applied to an input end of a force multiplier 66 which includes an output end which produces the primary pressure of the fluid within the interior 64 of the bellows means 60. The primary pressure is directly proportional to and significantly larger than the intermediate pressure of the fluid in order to generate sufficient force for preventing the undesired relative rotation. Obviously, the peristaltic pumping might be directly applied to the interior 64 of the bellows means 60 but in the preferred embodiment, it is felt that the pressure which can be produced by peristaltic pumping would not be sufficient to produce a force of the magnitude needed to insure proper braking by the friction discs 34, 38.

To produce peristaltic pumping of the fluid during the rotation of the differential casing 12 relative to the side gear 30, the annular wall 54 supports a collapsable tubing means for producing the pumping and the axle shaft 16 which is rigidly secured to the side gear 30 supports a planetary roller means 68 which will, during the relative rotation, progress along the tubing means to cause the fluid to be pumped in a manner which is well known in the peristaltic pumping art. The planetary roller means 68 includes a ring 70 having a central opening 72 which is received on the splined end 74 of the axle shaft 16. A plurality of rollers 76 are mounted on the ring 70 and are provided with radial dimensions which extend beyond the exterior surface 78 of the ring 70 so that they will compress a tubing means having fluid located therein to cause the fluid entrapped between the area of contact at adjacent rollers to be progressively transmitted along the interior of the tubing means when there is relative rotation between the planetary roller means 68 and the tubing means.

To insure that such a tubing means is properly compressed, the tubing means in peristaltic pumps are generally supported by a cylindrical surface. For this purpose, the annular wall 54 includes an interior cylindrical surface 80. In the preferred embodiment, a length of collapsable tubing means 82 is formed into a single loop about the interior cylindrical surface 80 so that the loop of collapsable tubing means 82 lies in a plane which is normal to the common axis and identical to the plane which includes the planetary roller means 68. However, rather than having the more familiar tubing means used in peristaltic pumps which has a circular cross section, the preferred embodiment utilizes a collapsable tubing means 82 having a collapsable wall 90 with a U-shaped cross section to include terminal edges thereof which are sealingly joined at the opposite axial ends of the annular wall 54. Specifically, the terminal edges of the collapsable wall 90 are compressed in grooves adjacent the interior cylindrical surface 80 as they are entrapped between the interior wall 52 and the interior surface of the end portion 58 of the differential casing 12 and the annular wall 54. It will be seen that the utilization of such a collapsable tubing means will facilitate fluid passage means for the operation of the pump and will thereby eliminate any external tubing or piping which is generally found in peristaltic pumps.

As seen in FIG. 2, the U-shaped collapsable wall 90 has a first end 92 and a second end 94 which have terminal portions thereof which are joined to and sealingly secured by a fitting 96 which is received within a cavity 98 of the annular wall 54. With the terminal portions sealed in this manner, the rotation of the side gear 30, and thus the axle shaft 16, relative to the differential casing 12 in a first direction D as indicated by the arrow in FIG. 2 will cause peristaltic pumping in the interior of the collapsable tubing means 82 from the first end 92 to the second end 94.

In order to insure that there is a supply of hydraulic oil to serve as the operating fluid for the differential speed limiting device 10, a reservoir 100 is located in the interior of the housing 32 in a space located between the end plate 48 and the interior wall 52. More significantly, there is provided an expandable wall 102 to define one surface for the reservoir 100. The expandable wall 102 is generally annular and also includes terminal edges which are sealingly secured to the opposite axial ends of the support ring 50 adjacent its interior cylindrical surface 104. Again, grooves at the edges of the inner cylindrical surface 104 receive the terminal edges of the U-shaped collapsable wall 102 to cause them to be sealingly compressed between the end plate 48 and the interior wall 52 and the support ring 50. However, unlike the collapsable wall 90 of the tubing means 82, the wall 102 for the reservoir 100 in the preferred embodiment is continuous to completely encircle the reservoir 100 without any interruption which could interfere with the retention of fluid therein. A vent hole 106 extends radially through the support ring 50 to cause the pressure within the differential housing 22 to be applied to one side of the expandable wall 102. Accordingly, the fluid within the reservoir 100 will be maintained at this base pressure throughout the operation of the differential speed limiting device 10 and the expandable wall 102 serves as a compensation means for insuring that the proper quantity of fluid can be initially supplied to the reservoir without any other substance being retained therein and that this quantity will be maintained through out the operation of the differential speed limiting device 10 even though there may be temperature variations of the fluid therein.

For a complete understanding of the reservoir 100, a detailed description of the preferred force multiplier 66 is required. It is the purpose of the force multiplier to receive the intermediate pressure from the peristaltic pumping produced by relative rotation between the two members and to produce a directly proportional, higher primary pressure within the bellows means for the operation of the friction discs 34, 38. For the differential speed limiting device 10 to properly function, the friction discs require a axial force which is of a higher magnitude than that which would normally be possible for the preferred peristaltic pumping and the force multiplier 66 enables this force to be obtained.

To provide the input end for the force multiplier 66, the interior wall 52 includes concentric, axially extending tubular portions 108 and 110 to define an annular cylinder 112. An annular piston 114 is disposed within the cylinder and includes a first side 116 against which the intermediate pressure from the peristaltic pumping can be applied.

To provide the output end of the force multiplier 66, a plurality of cylindrical pistons 118, as best seen in FIG. 3, extend from a second side 120 of the piston 114 to be aligned with and capable of being received within a plurality of holes 122 in the radial plate 48. Each of the holes 122 includes sealing rings to be capable of closely and sealingly receiving the cylindrical piston 118 therein. When the hydraulic oil servicing as the operating fluid is entrapped within the interior 64 of the bellows means 60, further insertion of the cylindrical pistons 118 within the interior 64 of the bellows means 60 will produce the primary pressure needed for producing the axial movement of the extended end 62 of the bellows means 60 which is required to produce the axial force for the operation of the friction discs 34, 38.

In the preferred force multiplier 66, the area of the annular piston 114 is eight times as large as the combined areas of the cylindrical pistons 118 so that the primary pressure will be eight times as great as the intermediate pressure. The area at the extended end 62 of the bellows means 60 is about 25 square inches. Therefore, if the intermediate pressure of the fluid by the peristaltic pumping were to reach a magnitude of about 64 p.s.i., the resulting compressive force on the friction discs 34, 38 would be $64 \times 8 \times 25$ or about 12,800 pounds of force.

However, a seen in FIG. 1, the cylindrical pistons 118 are not actually received within the holes 122 when the annular piston 114 is not being acted upon by the peristaltic pumping and the intermediate pressure of the fluid produced thereby. Accordingly, there is a small gap 124 around each cylindrical piston 118 and this enables the fluid in the reservoir 100 to be received within the interior 64 of the bellows means 60 until the force multiplier 66 is being utilized. To further insure that the bellows means 60 is properly extended to entrap a sufficient quantity of fluid therein and that the piston 114 is fully inserted into the annular cylinder 112 to produce the gap 124, there is provided a plurality of springs 126 which extend from the extended end 62 of the bellows means 60 to be received within a central cavity 128 of each cylindrical piston 118. Accordingly, when an intermediate pressure is applied to the first side 116 of the annular piston 114, there will be axial movement of the annular piston 114 sufficient to cause the plurality of cylindrical piston 118 to be received within the holes 122. Once the pistons 118 are sealingly received within the holes 122 the piston 118 will act as the output end of the force multiplier 66 to sufficiently increase the pressure of the fluid within the interior 64 of the bellows means 60 to cause compression of the friction discs 34, 38. If the intermediate pressure is sufficiently reduced, the springs 126 will cause the annular piston 114 to be fully inserted into the annular cylinder 112 and again produced the gap 124 to allow the fluid within the reservoir 100 to be available for make-up fluid which might have been lost through leakage around the seals at the holes 122. Insuring that fluid from the reservoir 100 can be resupplied to the interior 64 of the bellows means 60 insures that a fixed quantity will be available within the interior 64 of the bellows means 60 after each operation for smoother, more predictable response on the next operation.

It can now be seen that the reservoir 100, although having been described hereinabove as being located between the end plate 48 and the interior wall 52, includes a volume of fluid therein which will be affected by the movement of the annular piston 114 and the plurality of the cylindrical pistons 118. Therefore, when fluid is drawn from the interior of the reservoir 100, to be applied to the first side 116 of the annular piston 114, there will be a corresponding reduction of the volume of the reservoir 100 by the movement of the annular piston 114 as the cylindrical pistons 118 are moved axially into and through the holes 122. Although the change in volumes on the opposite sides 116, 120 of the annular piston 114 are not identical, because of the inclusion of the cylindrical pistons 118, the expandable wall 102 as described hereinabove will insure that a quantity of fluid within the reservoir 100 will be maintained at the basic pressure so that the differential speed limiting device 10 will function with an overall fixed quantity of fluid and will not have its operation unduly influenced by the actual pressure or temperature variations which may exist within the interior of the differential housing 22 as sensed through the hole 106.

Having explained the reservoir 100, the force multiplier 66 and the means for producing peristaltic pumping when a differential rotational speed occurs, it is appropriate to provide a detailed explanation of the fluid passage means utilized to facilitate operation of the preferred differential speed limiting device 10. To allow passage of the operating fluid from the reservoir 100 to the collapsable tubing means 82 and then to the input end of the force multiplier 66 at the annular cylinder 112, a series of ports are provided through the interior wall 52 and a series of bores and channels are provided within the interior of the annular wall 54. At the first end 92 of the collapsable tubing means 82, there is provided a radially extending groove bore 130. Communicating with the groove and bore 130 is an axially extending bore 132 which communicates with the reservoir 100 through a small port 134 in the interior wall 52. Additionally, there is an axially extending bore 136 communicating with the groove and bore 130 which communicates with the first side 116 of the annular piston 114 within the annular cylinder 112 through a small port 138. Each of the bores 132 and 136 includes biased check means or flow restricting means which will be better explained hereinbelow during a discussion of the total operation of the differential speed limiting device. However, since the preferred differential speed limiting device 10 is intended to operate effectively in either direction relative rotation, there are similar ports and bores provided at the second end 94 of the collapsable tubing means 82. The radially extending groove and bore 140 is identical to the groove and bore 130. Similarly, there are axially extending bores 142 and 146 which are respectively identical to the bores 132 and 136. Although not shown in FIG. 1, there are provided at the end 94 of the collapsable tubing means 82 small ports extending through the interior wall 52 associated with the bores 142 and 146 which are identical to the ports 134 and 138 as discussed hereinabove.

Although the embodiment shown in FIGS. 1, 2 and 3 is the preferred embodiment and includes sufficient information for one to see the structural relationships which are required for the proper functioning of the preferred differential speed limiting device 10, there are a number of features which can best be explained by a schematic representation of the invention. Accordingly, FIGS. 4–8 have been included to show a schematic view of the invention which can be directly related to the embodiment shown in FIGS. 1, 2 and 3. For this purpose, where appropriate, identical numbers will be utilized but there might be included additional numbers to describe features which could not be properly demonstrated in FIGS. 1, 2 and 3 and which will provide a broader understanding of the invention to include other embodiments rather than being limited to the specific embodiment as shown in FIGS. 1, 2 and 3.

Figure 4:
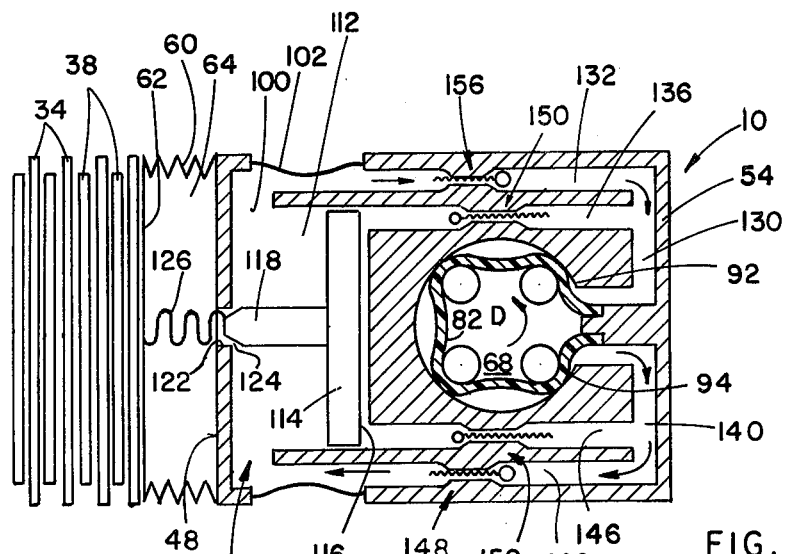
FIG. 4 is schematic drawing of the preferred embodiment of the invention prior to any significant relative rotation between the affected members associated with the differential of FIG. 1.

As seen in FIG. 4, the schematic view of the differential speed limiting device 10 includes the planetary roller means 68 which is disposed within the interior of the annular wall 54 and rotating slowly in the first direction D. There are included paths for the fluid through the bores 130, 132 and 136 associated with the first end 92 of the collapsable tubing means 82. There are also included paths for the fluid through the bores 140, 142 and 146 which are associated with the second end 94 of the collapsable tubing means 82.

To supply hydraulic fluid from the interior of the reservoir 100 to the input end of the force multiplier 66 at the first side 116 of the piston 114, the hydraulic fluid would need to be carried by the peristaltic pumping through a first passage means 132, 130 (including the bores 132 and 130) to the first end 92 of the collapsable tubing means 82. The peristaltic pumping would cause the fluid entrapped within the collapsable tubing means 82 to be delivered to the second end 94 for the fluid to be transmitted by a second passage means 140, 146 (including the bores 140 and 146) to the input end of the force multiplier 66.

However, the differential speed limiting device 10 is not intended to supply fluid for limiting the relative rotational speed at all magnitudes but is rather intended to prevent excessive relative rotation between the differential casing 12 and the side gear 30. Accordingly, at the relatively low differential speeds as shown in FIG. 4, the fluid would travel through a first passage means 132, 130 from the interior of the reservoir 100 and then be supplied to a fourth passage means 140, 142 for re-entry into the interior of the reservoir 100. In other words, at the relatively low differential speeds between the differential casing 12 and the side gear 30, the fluid will not be directed to the input end of the force multiplier 66 but will simply be withdrawn from the reservoir 100 and returned to the reservoir 100 without causing any braking action which might limit the relative rotational speed between the members. The condition at which this by-passing will occur will depend upon the predetermined setting of the first flow sensitive element 148 in the bore 142.

Figure 5:
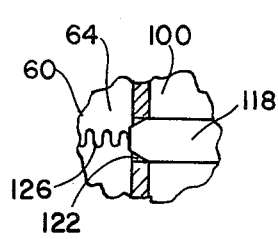
FIG. 5 is a fragmentary view of one portion of the embodiment as shown in FIG. 4 when the significant relative rotation between the members begins.

The flow sensitive element 148 is preferably a ball check valve which is biased in an open position against flow into the interior of the reservoir 100. If the relative rotational speed in the first direction D does not exceed about 50 r.p.m., for example, flow created by the peristaltic pumping will be insufficient to cause the ball check valve of the first flow sensitive element 148 to be seated against the biasing included therein. In one embodiment of the invention, the peristaltic pumping of the fluid as the relative rotational speed approaches 50 r.p.m. will produce a fluid flow approaching 1 gallon per minute through the bore 142. At a flow of about 1 gallon per minute a force of about 2 pounds will be generated on the ball of the flow sensitive element 148 which would be sufficient to cause it to be fully seated and prevent any further return of fluid to the interior of the reservoir 100. However, prior to this time, there would not be any buildup of the intermediate pressure at the input end of the force multiplier 66 so that the piston 114 will be maintained in a position fully received within the cylinder 112 by the biasing of the sping 126. Accordingly, the gap 124 will exist between the cylindrical pistons 118 and the hole 122 so that the reservoir 100 will be capable of providing a makeup fluid to the interior 64 of the bellows means 60 so that a fixed quantity of fluid will be retained therein once the force multiplier 66 begins to function.

Where the relative rotational speed has exceeded 50 r.p.m., the ball of the flow sensitive element 148 is fully seated to allow the hydraulic fluid from the second end 94 of the collapsable tubing means 82 to then be supplied through the second passage means 140, 146. As seen in FIG. 5, once the intermediate pressure for the input end of the force multiplier 66 begins to be generated, the cylindrical piston 118 will be received within the hole 122 and a fixed quantity of fluid will then be retained within the interior 64 of the bellows means 60 with the disappearance of the gap 124.

Figure 6:
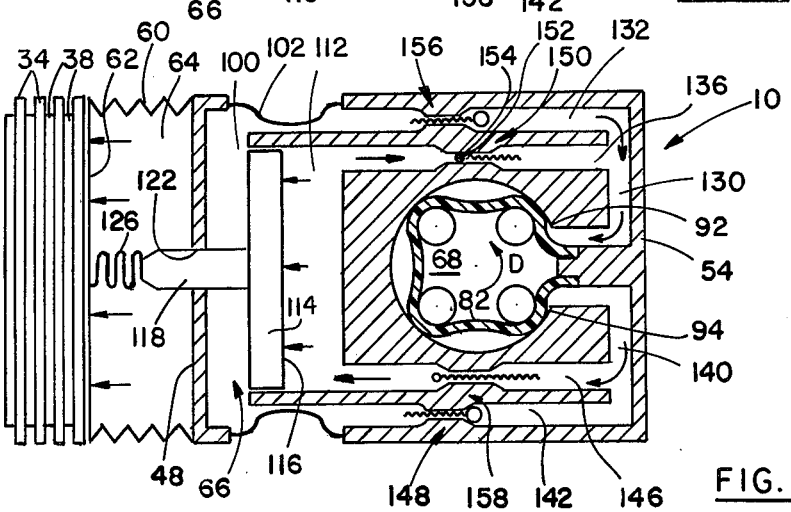
FIG. 6 is a schematic drawing like that in FIG. 4 demonstrating the operation of the preferred embodiment tending to prevent relative rotation between the members.

As seen in FIG. 6, as the relative rotational speed begins to increase, the intermediate pressure within the interior of the cylinder 112 will reach a higher level and cause axial movement of the annular piston 114 and the cylindrical pistons 118. Generally, in this condition, the amount of pressure being generated to produce the axial movement of the force multiplier 66 will depend upon the magnitude of the relative rotational speed of the differential casing 12 and the side gear 30. As this axial movement is produced, the cylindrical pistons 118 will be further inserted within the fixed volume of fluid within the interior of the bellows means 60 causing the extended end 62 to produce a proportional force on the friction discs 34, 38. However, although it can be seen under what conditions the second passage means 140, 146 will be utilized for the supply of the operating fluid to the force multiplier 66, a third passage means 136, 132 would appear to allow the fluid to escape from the cylinder 112 and to thereby prevent the proper axial movement of the piston 114.

However, within the bore 136 there is included a first means for restricting the flow of the fluid in the form of a flow restrictor 150. The flow restrictor 150 also includes a ball element 152 which is biased against flow from the cylinder 112 to the interior of the reservoir 100. However, any flow in this direction will tend to compress the spring of the flow restrictor 150 to cause the ball 152 to be positioned within a region 154 of reduced cross section to allow some flow of the fluid around the ball 152 throughout the time it is positioned within the region 154 of reduced cross section. In this condition, the ball 152 will sufficiently restrict the flow of fluid to maintain the flow at a flow rate in the third passage means 136, 132 which is less than that being provided by the peristaltic pumping in the second passage means 140, 146. If the flow rate in the second passage means 140, 146 is maintained at this higher flow rate, then the pressure of the fluid within the cylinder 112 of the force multiplier 66 will be sufficiently established to cause the axial movement of the piston 114 to effect the increase of pressure within the bellows means 60 to cause the compression of the friction discs 34, 38 as shown in FIG. 6.

Again, by way of example, it has been found that the peristaltic pumping of the preferred differential speed limiting device 10 can be sufficient to generate an intermediate pressure within the cylinder 112 which approaches 100 p.s.i. However, because of the general structure of the bellows means 60 and the resulting primary pressure which would be established therein, it is not considered necessary nor desirable to generate an intermediate fluid pressure which exceed the 100 p.s.i. level.

Figure 7:
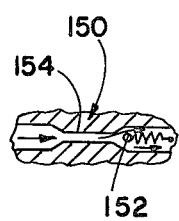
FIG. 7 is a fragmentary view of one portion of the embodiment as shown in FIG. 6 when the relative rotation between the members produces an excessive fluid pressure.

Therefore, as seen in FIG. 7, the arrangement of the ball 152 in the flow restrictor 150 is such that the creation of a pressure approaching 100 p.s.i. will sufficiently compress the spring of the flow restrictor 150 to cause the ball 152 to be positioned outwardly of the region 154 of reduced cross section. When the ball 152 is so positioned, the flow rate in the flow restrictor 150 will be significantly increased tending to limit the amount of pressure which can be provided to the cylinder 112. As the fluid is allowed to escape from the cylinder 112 through the flow restrictor 150, it may be returned to the interior of the reservoir 100 through the third passage means 136, 132. Admittedly, most of the fluid would again be directed through the bore 130 to supply the first end 92 of the collapsable tubing means 82.

However, if the relative rotation were quickly reduced, the third passage means 136, 132 would be necessary to relieve the pressure within the cylinder 112 and allow the fluid to be returned to the interior of the reservoir 100. With a low relative rotation, the intermediate pressure would be below 100 p.s.i. level and the ball 152 would again be located within the region 154. There may be some concern that such a return flow would be sufficient to cause a second flow sensitive element 156, which is identical to the first flow sensitive element 148, in the bore 132 to be seated and thereby preventing any flow to the reservoir 100. However, flow restrictor 150 is preferably designed for normal operation to allow a maximum flow rate, for example, of approximately 1/10 of a gallon per minute which is significantly less than the 1 gallon per minute required to seat the ball element of the second flow sensitive element 156. Consequently, the second flow element 156 will remain open for the return of the operating fluid to the reservoir 100. Obviously, if some rotation still exists, some of the fluid would be drawn into the collapsible tubing means 82 and could be returned to the reservoir 100 by the fourth passage means 140, 142 as occurs in the operation shown in FIG. 4.

As has heretofore been mentioned, the preferred differential speed limiting device 10 will properly function in either direction of rotation of the side gear 30 relative to the differential casing 12. However, the description provided hereinabove has been directed to the means for limiting the relative rotational speed in only the first direction D. Although the various bores have all been utilized for the flow of fluid in the specifically defined passage means for rotation in the direction D, the same bores can be utilized when the relative rotation is in the opposite direction.

The rotation of the planetary roller means 68 in the opposite direction at the lower rates would again allow by-passing through the second flow sensitive element 156 to prevent the establishment of the intermediate pressure in the force multiplier 66 in the same manner as is described hereinabove. Once the relative rotational speed exceeds 50 r.p.m., the ball in the flow sensitive element 156 would seat to create the intermediate pressure. As a result, fluid would be drawn through the fourth passage means 142, 140 to the second end 94 of the collapsable tubing means 82 and discharged from the first end 92 for supply through a fifth passage means 130, 136 to the input end of the force multiplier 66. Again, as the intermediate pressure builds up within the cylinder 112, a flow restrictor 158 in the bore 146, which is identical to the flow restrictor 150, would allow a building up of the intermediate pressure within the cylinder 112 to act on the first side 116 of the piston 114 but still enable it to be returned to the interior of the reservoir along a sixth passage means 146, 142 should it be necessary.

Figure 8:
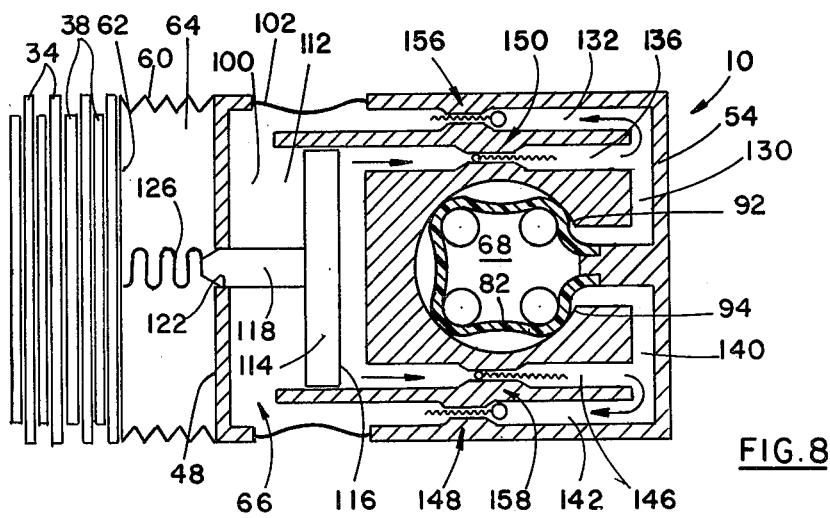
FIG. 8 is a schematic drawing like that in FIG. 6 after relative rotation between the members has been reduced to zero.

As seen in FIG. 8, after the intermediate pressure in the cylinder 112 has been established by rotation in either the direction D or in the opposite direction, it is possible for the friction discs 34, 38 to have sufficiently operated on the side gear 30 and the differential casing 12 to cause the relative rotation therebetween to be reduced to zero. In this condition, the intermediate pressure within the cylinder 112 would no longer be generated by the peristaltic pumping action and the fluid retained therein would seek a return to the reservoir 100. The application of force by the spring 126, although not sufficiently great to create a compressive force on the friction discs 34, 38, would tend to return the piston 112 to a fully inserted location within the cylinder 112. Under this condition, the fluid would return to the reservoir 100 by either or both the third passage means 136, 132 and the sixth passage 146, 142. Again, the flow which would be allowed in the bores 136 and 146 would not be of a sufficient magnitude to cause the first flow sensitive element 148 or the second flow sensitive element 156 to prevent the return of fluid to the reservoir 100. After a short interval of no relative rotation between the differential casing 12 and the side gear 30 the piston 114, would be turned to the position as generally shown in FIG. 4.

Accordingly, to facilitate the operation of the differential speed limiting device 10 in either direction, the flow sensitive elements 148, 156 are designed to freely allow fluid to be drawn from the interior of the reservoir 100 and to be returned to the interior of the reservoir 100 unless there is a sufficient pressure generated by the differential rotational speed to justify the use of the friction discs 34, 38. Similarly, the inclusion of a primary pressure within the interior 64 of the bellows means 60 will be generally maintained by either of the flow restrictors 150, 158 but neither will permit the intermediate pressure producing the primary pressure to be entrapped at the input end of the force multiplier 66 when the relative rotational speed has been sufficiently reduced to discontinue the application of compressive force to the friction discs 32, 38. In other words, the flow sensitive elements 148, 156 and the flow restrictors 150, 158 will only function to decrease or prevent the flow of fluid in one direction for the effective operation of the differential speed limiting device 10 but will allow fluid to flow freely in the other direction if that direction is required for the proper operation of the differential speed limiting device 10.

As thus explained, it can now be seen that the preferred differential speed limiting device 10 includes a number of features which are attractive for the limiting of relative rotational speed between a first member and a second member which are capable of independent rotation about a common axis of rotation. Specifically, the differential speed limiting device will operate in either direction of rotation and includes no running seals which might interfere with the retention of the operating fluid therein. Since the hydraulic oil utilized as the operating fluid is retained within a totally sealed system, there can be fluid contamination and the inclusion of the expandable wall 102 for the reservoir 100 insures that the fluid will be capable of responding to temperature and pressure variations without affecting the operation of the speed limiting device 10. There is also included an overload protection in the form of the flow restrictors 150, 158 which will function to increase the flow rate therethrough when the primary pressure is building up to an excessive level within the interior of the bellows means 60.

Additionally, the operation of the differential speed limiting device 10 is totally automatic and will engage and disengage automatically depending upon the magnitude of the relative rotational speed. Similarly, since the compressive force will not be applied to the friction discs 34, 38 until a minimum relative rotational speed is exceeded, there will be no excessive wear of the friction discs 34, 38. However, as normal wear is experienced in the friction discs 34, 38, the arrangement of the bellows means 60 is such that the device will function automatically to compensate for the wear thereof throughout the expected life of the differential speed limiting device 10.

Further, although the preferred embodiment is shown to be utilized in a drive axle differential configuration, it should be clear that a similar device could be utilized in, for example, an interaxle differential configuration which might require the same limit on relative rotational speed. Since the device is simple, compact and self-contained, the differential speed limiting device of the present invention could be utilized in prior art differential configurations with little or no redesign of components to provide the desired automatic speed limiting function.

We claim:

1. A differential speed limiting device for limiting the relative rotational speed between a first member and a second member capable of independent rotation about a common axis of rotation, said differential speed limiting device comprising:

first and second friction disc means respectively mounted for rotation with said first and said second members and capable of being compressed axially to generate frictional contact therebetween tending to reduce said relative rotational speed between said first and said second members;

an annular housing mounted for rotation with said first member;

an annular bellows means mounted on said housing and having an extended end aligned with said first and said second friction disc means, said extended end being capable of axial movement toward and away from said first and said second friction disc means when a primary pressure of fluid within said bellows means is respectively increased and decreased;

said housing including therein a force multiplier having an input end capable of having an intermediate pressure of said fluid acting thereon and an output end which produces said primary pressure of said fluid within said bellows means, said primary pressure being directly proportional to and larger than said intermediate pressure;

said housing having a pump portion which includes an interior cylindrical surface located therein;

a length of collapsible tubing means having a first end and a second end and being formed into a single loop about said interior cylindrical surface, said loop lying in a plane which is normal to said common axis;

planetary roller means mounted in said plane for rotation with said second member and in frictional surface contact with said tubing means, said roller means being of such radial dimensions as to compress said tubing means against said interior cylindrical surface in a region of said contact;

said housing having a reservoir for said fluid therein;

a first passage means for said fluid between said reservoir and said first end of said tubing means;

a second passage means for said fluid between said second end of said tubing means and said input end of said force multiplier;

said second member rotating in a first direction relative to said first member causing said roller means to circumferentially travel along said tubing means from said first end to said second end to produce peristaltic pumping of said fluid from said reservoir through said first passage means, said tubing means, and said second passage means to said input end of said force multiplier to produce said intermediate pressure fo said fluid therein; and means for discharging said fluid from said input end of said force multiplier to said reservoir to reduce said intermediate pressure of said fluid at said input end of said force multiplier when there is no rotation of said second member relative to said first member.

2. The differential speed limiting device as set forth in claim 1, wherein said force multiplier includes first piston means and second piston means which are joined together for movement within said housing, said first piston means being disposed for movement within cylinder means of said force multiplier within said housing and having a working surface acting as said input end of said force multiplier when said intermediate pressure of said fluid is established within said cylinder means; said second piston means being disposed to sealingly extend into said bellows means in response to said movement of said first piston means; said second piston means to act as said output end of said force multiplier to produce said primary pressure of said fluid as said bellows means includes a fixed quantity of said fluid therein; said first piston means having a cross sectional area larger than a cross sectional area of said second piston means.

3. The differential speed limiting device as set forth in claim 2, wherein said cross sectional area of said first piston means is about eight times as large as said cross sectional area of said second piston means.

4. The differential speed limiting device as set forth in claim 2, wherein said first piston means and said cylinder means are annular and said second piston means includes a plurality of cylindrical pistons extending from said first piston means to be received within sealed circular holes in a wall of said housing supporting said bellows means.

5. The differential speed limiting device as set forth in claim 4, wherein said plurality of said pistons and said holes are circumferentially evenly spaced about said first piston means.

6. The differential speed limiting device as set forth in claim 1, wherein said means for discharging said fluid from said interior of said bellows means to said reservior includes a third passage means for said fluid between said input end of said force multiplier and said reservoir having a first means for restricting flow of said fluid from said input end of said force multiplier to said reservior to allow said intermediate pressure of said fluid at said input end to be established if said relative rotation in said first direction is sufficient to produce a first flow rate by said peristaltic pumping of said fluid within said second passage means to said input end of said force multiplier which is greater than a second flow rate of said fluid through said first means for restricting said flow.

7. The differential speed limiting device as set forth in claim 6, wherein said first means for restricting said flow includes a length of said third passage means having a reduced cross section with a flow restricting element disposed therein, said flow restricting element having cross sectional dimensions less than said reduced cross section to allow said fluid to flow within said length around said flow restricting element to establish said second flow rate of said fluid.

8. The differential speed limiting device as set forth in claim 7, wherein said flow restricting element is biased against said flow from said input end of said force multiplier to said reservoir to be capable of remaining within said length until said intermediate pressure of said fluid at said input end reaches a maximum desired level and to be capable of being displaced outwardly of said length to allow an increased flow of said fluid above said second flow rate when said intermediate pressure of said fluid at said input end of said force multiplier is above said maximim desired level of said intermediate pressure.

9. The differential speed limiting device as set forth in claim 6, further including means for limiting said peristaltic pumping of said fluid to said input end of said force multiplier until said relative rotation in said first direction exceeds a minimum rotational speed.

10. The differential speed limiting device as set forth in claim 9, wherein said means for limiting said peristaltic pumping to said input end of said force multipler includes a fourth passage means between said second end of said tubing means and said reservoir, said fourth passage means having a first flow sensitive element therein allowing a by-pass flow rate to said reservoir rather than to said input end of said force multiplier until said relative rotation in said first direction exceeds said minimum rotational speed.

11. The differential speed limiting device as set forth in claim 10, wherein said first flow sensitive element is a stop check means which is biased open until said by-pass flow rate is exceeded when said relative rotation in said first direction exceeds said minimum rotational speed and remains closed until said relative rotation in said first direction is less than said minimum rotational speed.

12. The differential speed limiting device as set forth in claim 1, wherein said reservoir is sealed and includes a compensation means for altering the internal volume therof so that it will contain only said fluid therein throughout the operation of said differential speed limiting device.

13. The differential speed limiting device as set forth in claim 12, wherein said ccmpensation means includes an expandable, ring-shaped diaphragm means disposed within said housing having a base pressure acting on one side thereof and said fluid in said reservoir on the other side thereof to maintain said fluid in said reservoir at said base pressure.

14. The differential speed limiting device as set forth in claim 1, wherein said interior cylindrical surface is on an annular wall which is located within said pump portion of said housing.

15. The differential speed limiting device as set forth in claim 14, wherein said length of collapsable tubing means includes a collapsable wall having a U-shaped cross section and including terminal edges thereof which are sealingly joined at opposite axial ends of said annular well adjacent said interior cylindrical surface so that a sealed interior of said collapsable tubing means is defined by an interior surface of said collapsable wall and said interior cylindrical surface.

16. The differential speed limiting device as set forth in claim 1, further including a fourth passage means for said fluid between said reservoir and said second end of said tubing means, a fifth passage means for said fluid between said first end of said tubing means and said input end of said force multiplier and said second member rotating in a second direction relative to said first member causing said roller means to circumferentially travel along said tubing means from said second end to said first end to produce peristaltic pumping of said fluid from said reservoir through said fourth passage means, said tubing means and said fifth passage means to said input end of said force multiplier to produce said intermediate pressure of said fluid therein.

17. The differential speed limiting device as set forth in claim 16, wherein said means for discharging said fluid from said input end of said force multiplier to said reservoir includes a third passage means for said fluid between said input end of said force multiplier and said reservoir having a first means for restricting flow of said fluid from said input end to said reservoir to allow said intermediate pressure of said fluid at said input end to be established if said relative rotation in said first direction is sufficient to produce a first flow rate by said peristaltic pumping of said fluid within said second passage means to said input end of said force multiplier which is greater than a second flow rate of said fluid through said first means for restricting said flow and a sixth passage means for said fluid between said input end of said force multiplier and said reservoir having a second means for restricting said flow of said fluid which is identical to said first means for restricting said flow of said fluid from said input end to said reservoir to allow said intermediate pressure of said fluid at said input end to be established if said relative rotation in said second direction is sufficient to produce said first flow rate by said peristaltic pumping of said fluid within said fifth passage means to said input end which is greater than said second flow rate of said fluid through said second means for restricting said flow.

18. The differential speed limiting device as set forth in claim 17, further including means for limiting said peristaltic pumping of said fluid to said input end of said force multiplier until said relative rotation in said first direction and said relative rotation in said second direction exceeds a minimum rotational speed.

19. The differential speed limiting device as set forth in claim 18, wherein said means for limiting said peristaltic pumping to said input end of said force multiplier includes a first flow sensitive element within said fourth passage means allowing a by-pass flow rate to said reservoir rather than to said input end until said relative rotation in said first direction exceed said minimum rotational speed and a second flow sensitive element like said first flow sensitive element within said first passage means allowing said by-pass flow rate to said reservoir rather than to said input end until said relative rotation in said second direction exceeds said minimum rotational speed.

20. The differential speed limiting device as set forth in claim 19, wherein said third passage means includes a portion of said first passage means having said second flow sensitive element therein and said sixth passage means includes a portion of said fourth passage means having said first flow sensitive element therein and said by-pass flow rate exceeds said second flow rate.

21. The differential speed limiting device as set forth in claim 17, wherein said interior cylindrical surface is on an annular wall which is located within said pump portion of said housing, said length of collapsable tubing means includes a collapsable wall having a U-shaped cross section and including terminal edges thereof which are sealingly joined at opposite axial ends of said annular wall adjacent said interior cylindrical surface so that a sealed interior of said collapsable tubing means is defined by an interior surface of said collapsable wall and said interior cylindrical surface.

22. The differential speed limiting device as set forth in claim 21, wherein said first, said second, said third, said fourth, said fifth and said sixth passage means are formed by holes in and extending through said annular wall and said pump portion of said housing.

* * * * *